United States Patent [19]

Klaeger

[11] Patent Number: 4,678,123

[45] Date of Patent: Jul. 7, 1987

[54] SPRAY NOZZLE FOR A LIQUID ATOMIZER

[76] Inventor: Karlheinz Klaeger, Portnerstrasse 84, 8902 Neusäess, Fed. Rep. of Germany

[21] Appl. No.: 800,489

[22] Filed: Nov. 21, 1985

[30] Foreign Application Priority Data

Nov. 29, 1984 [DE] Fed. Rep. of Germany ....... 3443640

[51] Int. Cl.[4] ........................ B05B 1/34; F16K 43/00; F16K 25/00

[52] U.S. Cl. .................................... 239/464; 239/473; 239/492; 239/493; 137/316; 137/454.2; 137/543.17

[58] Field of Search ............... 239/333, 463, 464, 472, 239/473, 491, 492, 493; 137/316, 454.2, 540, 543.13, 543.17

[56] References Cited

U.S. PATENT DOCUMENTS

| | | | |
|---|---|---|---|
| 2,366,004 | 12/1944 | Crittenden | 137/316 |
| 2,921,747 | 1/1960 | Burman | 239/464 |
| 3,061,202 | 10/1962 | Tyler | 239/333 |
| 3,749,122 | 7/1973 | Gold | 239/491 X |
| 3,897,006 | 7/1975 | Tada | 239/333 |
| 4,352,462 | 10/1982 | Watanabe et al. | 239/266 |
| 4,358,057 | 11/1982 | Burke | 239/333 |

FOREIGN PATENT DOCUMENTS 1882400 1/1961 Fed. Rep. of Germany .

*Primary Examiner*—Andres Kashnikow
*Assistant Examiner*—Patrick N. Burkhart
*Attorney, Agent, or Firm*—Flynn, Thiel, Boutell & Tanis

[57] ABSTRACT

A spray nozzle for manually operated liquid atomizer comprises a valve pin forming a normally closed check valve and biased by a resetting spring so that a head portion thereof is biased toward a co-operating valve seat and an annular stop flange thereof having a larger diameter than this head portion is biased toward a radially projecting holding lip which is formed at the valve-side end of the cavity of a cup-shaped nozzle member having a bottom which supports the resetting spring.

15 Claims, 3 Drawing Figures

SPRAY NOZZLE FOR A LIQUID ATOMIZER

FIELD OF THE INVENTION

This invention relates to a spray nozzle of the kind which, by means of a union nut, is adjustably held on a threaded housing portion of a manually operated liquid atomizer.

BACKGROUND OF THE INVENTION

In German utility model No. 1,882,400 a spray nozzle for a manually operated liquid atomizer is disclosed as being composed of a holding socket which is adapted for being axially inserted into a threaded housing portion of a manually operated liquid atomizer, whereby the socket serves to hold a check valve that controls the exit of a liquid from a pressure duct leading to a liquid reservoir. The check valve is formed with a valve pin having a conically formed head portion, the head portion of the valve pin being biased by means of a resetting spring against a valve seat which is formed at an orifice of the pressure duct. The resetting spring is supported by the bottom of a cup-shaped twist member, which is co-axially inserted into the socket for a co-operation of an axial face formed by its bottom with the actual nozzle that forms an integral part of a union nut by means of which these separate nozzle members are held together for their mounting on the threaded housing portion of the atomizer. Since with this arrangement movement of the valve pin under the biasing force of the resetting spring is limited only by the cooperation of the pin head with the valve seat, a rather skillful manipulation of the individual nozzle members is required for their final assembly on the threaded housing portion of the atomizer. The most critical phase during this assembly thereby exists at the moment just before the mutual gripping of the inner thread of the union nut and of the outer thread of the housing portion, since only when this gripping has been effected will the biasing force of the resetting spring acting axially on the valve pin of the check valve force the pin head in a stable manner against its cooperating valve seat. Since the valve pin, due to a much smaller diameter, is further provided with a rather instable arrangement within the cavity of the twist member, this particular design feature also essentially contributes to the difficult assembly work of this known spray nozzle and contributes to an operation of the check valve which is not optimal for this specific kind of an adjustable spray nozzle.

This invention accordingly deals with the object of providing a spray nozzle which, when used for a manually operated liquid atomizer, may be more easily assembled from its individual members and which also may be mounted on a threaded housing portion of the atomizer in a less complicated manner. A still further object of the invention is the provision of such a spray nozzle which selectively allows, simply by a turning of the union nut, either a blocking or no such blocking of the pressure duct for the possibility of an offer of two respectively different embodiments of such manually operated liquid atomizers.

SUMMARY OF THE INVENTION

A spray nozzle according to the present invention is provided with a check valve having a valve pin which, by means of a resetting spring, not only is biased at its head portion toward a valve seat, but also has an annular stop flange of a diameter larger than the diameter of the pin head which is biased toward a radially projecting holding lip at the valve-side end of the cavity of a twist member which with its axial face cooperates with a nozzle on a union nut. The stop flange preferably also axially guides the valve pin on the inner wall of a cup-shaped cavity in the twist member which, when compared with the axial adjustment range of the valve pin, may have either a smaller or a larger axial length for two respectively different embodiments of the inventive spray nozzle. With such a different axial length, it accordingly is possible to offer a manually operated liquid atomizer in which the pressure duct may be or may not be blocked for an exit of the liquid which is stored in a container to which this atomizer is exchangeably connected.

By providing the annular stop flange on the valve pin and the radially projecting holding lip on the twist member, these two nozzle members may be easily pre-assembled together with the resetting spring, the force of which then biases the stop flange into a contact with the holding lip. This pre-assembled unit then may further be pre-completed by adding the holding socket, which is preferably provided with a lip portion having an axial bore for forming the valve seat. In this manner a less complicated arrangement of the spray nozzle on the threaded housing portion of a manually operated liquid atomizer is made possible.

DETAILED DESCRIPTION

Figure 1:
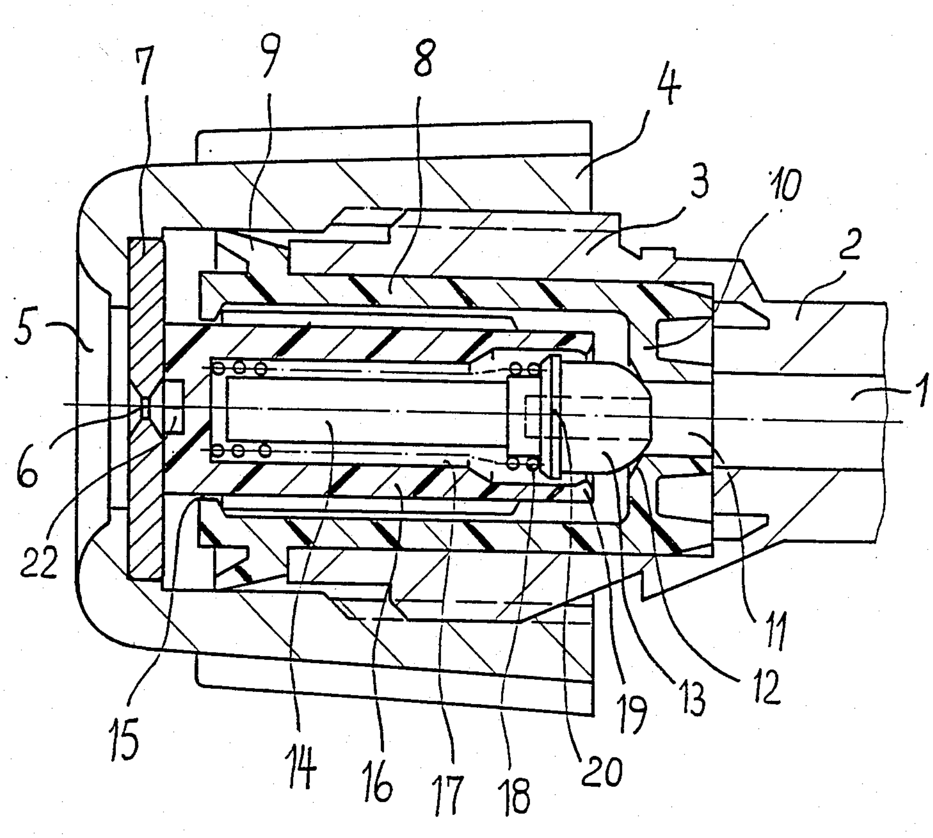
FIG. 1 is a longitudinal section of the inventive spray nozzle installed on a threaded housing portion of a manually operated liquid atomizer.
Figure 3:
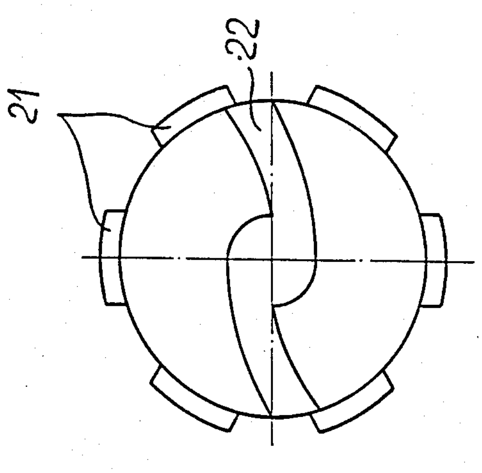
FIG. 3 is an end view of the twist member shown in FIG. 2.
Figure 2:
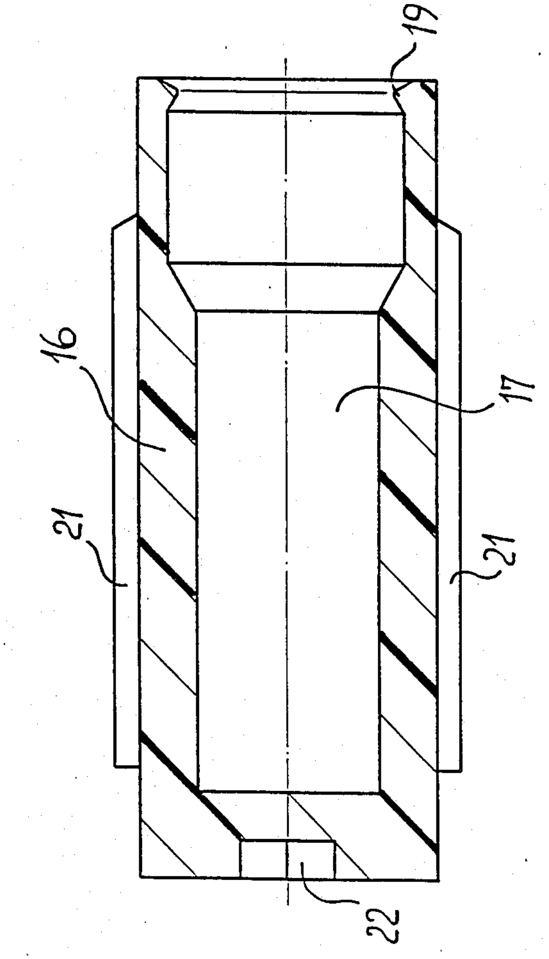
FIG. 2 is a longitudinal section of a twist member of the spray nozzle according to FIG. 1.

A spray nozzle according to the present invention is preferably intended for use with an atomizer housing of a conventional manually operated liquid atomizer, for example that disclosed in U.S. Pat. No. 4,519,527. Referring to FIG. 1 hereof, liquid atomizers of this kind are provided with a conventional and not-illustrated piston pump means which may be actuated by a not-illustrated handle for pumping a liquid which is stored in an interconnected and not-illustrated container through a pressure duct 1 of the atomizer housing 2, whereby this pressure duct 1 is normally closed by a check valve that will only allow the exit of the fluid through the nozzle when the pump pressure of the fluid within this pressure duct 1 is sufficiently high.

The atomizer housing 2 is provided with a threaded portion 3 that extends coaxially with the orifice portion of the pressure duct 1. This threaded housing portion 3 receives a substantially cupshaped union nut 4 which has an axial opening 5 in its bottom for forming a spray beam of the fluid that is advanced from the pressure duct 1 to the nozzle 6 of a nozzle disk 7 which is held by the union nut 4. For an alternative embodiment of the spray nozzle this nozzle 6 may be an integrated part of the union nut 4, whereby then the separate nozzle disk 7 will not be provided.

The threaded housing portion 3 holds an axially inserted holding socket 8 which preferably is an injection molded part made of polyethylene. This socket 8 has an annular stop flange 9 which contacts an axial face of the threaded housing portion 3 when the socket 8 is axially inserted into the same. This flange 9 forms for sealing purposes a packing ring that cooperates with the inner wall of the union nut 4 as soon as the same is screwed onto the outer thread of the housing portion 3. At its opposite end the socket 8 is further provided with an integral lid portion 10, which for an alternative embodiment of this socket 8 may instead also be provided as a separate nozzle member which then, however, should by fixedly connected to the socket 8. This lid portion 10 is provided with an axial bore 11 of a smaller diameter than the pressure duct 1, whereby the orifice of this axial bore 11 forms a valve seat 12 for the head 13 of a valve pin 14. For a less preferred embodiment of the inventive spray nozzle, this valve seat 12 may also be formed at the orifice of the pressure duct 1, whereby the lid portion 10 then will not be provided. At its opposite end the socket 8 is provided with an axial opening 15 through which a cup-shaped twist member 16 may be axially inserted into a cavity in the socket 8.

The twist member 16 receives in a cavity 17 therein the coaxially arranged valve pin 14 which, for the completion of a check valve controlling the exit of the fluid from the pressure duct 1, is biased at its head 13 towards the valve seat 12 by a resetting spring 18 that is supported by the bottom of this twist member 16. The valve-side end of the cavity 17 has a larger diameter than its bottom-side and is restricted by a radially projecting holding lip 19, which is provided for co-operation with an annular stop flange 20 of the valve pin 14 having a larger diameter than the pin head 13. The valve pin 14 accordingly will be biased by the resetting spring 18 at this stop flange 20 into contact with the holding lip 19 when the twist member 16 is first pre-assembled with the pin 14 and the resetting spring 18. The diameter of the annular stop flange 20 is thereby at the same time chosen such as to effect an axial guide of the pin 14 on the inner wall of the twist member 16 along the respectively larger sized diameter portion of the cavity 17. In such a pre-assembled unit, movement of the valve pin 14 due to the biasing force of the resetting spring 18 accordingly will be limited through the contact of the stop flange 20 with the holding lip 19 of the twist member 16.

This twist member 16 derives its name from the provision of a groove 22 in the axial face of this member which contacts the nozzle disk 7 in a manner facilitating co-operation of this groove 22 with the nozzle 6. This groove 22, which sometimes is also called a swirling groove, is in fluid connection with the cavity of the socket 8 through the axial opening 15 of the same so that it will receive the liquid from the pressure duct 1 whenever the liquid is pumped through the same and whenever thereby the normally closed check valve is opened. The liquid which then is advanced from the pressure duct 1 through the axial opening 11 of the lid portion 10 into the cavity of the socket 8 will then further be advanced through axially extending channels which are provided between axially extending projections 21 formed on the surface of the twist member 16 which, like the socket 8, is preferably an injection molded part made also of polyethylene. These projections 21 extend only over a partial length of the twist member 16 and are provided with a diameter of a common enveloping circle which is slightly larger than the diameter of the axial opening 15 of the socket 8 and at the same time slightly smaller than the inner diameter of the cavity therein. With these projections 21 it accordingly has been made possible that, after a pre-assembly of the unit comprising this twist member 16, the valve pin 14 and the resetting spring 18, this pre-assembled unit may be completed by also adding the socket 8, which then may easily be slipped with its opening 15 over the projections 21 until the axially snapped-over position in relation to the twist member 16 is obtained, which is shown in FIG. 1. This completed pre-assembly then only has to be axially inserted into the threaded housing portion 3, whereupon then still the union nut 4 as pre-assembled with the nozzle disk 7 must be screwed onto the outer thread of this housing portion to thereby hold fast all of the individual members of the spray nozzle.

By rotating the union nut 4 relative to the threaded housing portion 3, the biasing force of the resetting spring 18 may either be weakened or reinforced to thereby influence in a respectively different manner the formation of a spray beam of the fluid that is advanced during each pumping stroke of the above mentioned piston pump means from the pressure duct 1 through the then opened check valve which is formed with the valve pin 14, and through the cavity of the socket 8, the flow channels formed between the projections 21, the opening 15, the groove 22 and finally the nozzle 6 to the exit opening 5 of the union nut 4. The axial adjustment range of the valve pin 14 is accordingly influenced by this rotation of the union nut 4 and by a cooperation of the twist member 16, which can be axially displaced from the position shown in FIG. 1 to a position so far to the right that its bottom contacts the valve pin 14 and will then accordingly hold fast the valve pin 14 in a relative position in which the pressure duct 1 will be steadily blocked so as to obstruct any possible exit of the fluid. When accordingly the axial length of the cavity 17 of the twist member 16 is provided, for an offer of two respectively different embodiments of the inventive spray nozzle, with an axial length which in comparison with the axial adjustment range of the valve pin 14 is either smaller or larger, it then will be possible to guarantee with the smaller axial length the possibility of a blocking of the pressure duct 1 or to ensure with the larger axial length that spraying of the liquid will always occur whenever its pumping pressure through the pressure duct 1 is sufficient to move the valve pin 14 away from the valve seat 12 against the biasing force of the resetting spring 18. These two different embodiments of the inventive spray nozzle therefore only require the provision of two interchangeable valve pins having different axial lengths but otherwise fully identical, to thereby allow an identical assembly of both forms of such adjustable spray nozzles.

What is claimed is:

1. A manually operated liquid atomizer, comprising:

a threaded housing portion having therein an opening and a pressure duct which communicates with and can carry a pressurized fluid to said opening;

a union nut which is adapted to be screwed onto said threaded housing portion and which has nozzle means thereon;

a socket adapted to be axially inserted into said opening in said threaded housing portion and having therein an axially extending cavity which receives check valve means for normally closing said pressure duct, said check valve means including a valve pin axially displaceably supported in a cavity of a cup-shaped twist member disposed coaxially in said cavity in said socket, said twist member having thereon an axially facing surface which co-operates with a surface of said nozzle means;

a resetting spring disposed within said cavity of said twist member and cooperable with a bottom wall of said twist member and said valve pin so as to bias a head portion of said valve pin against a valve seat of said check valve means; and an annular stop flange which is provided on said valve pin and has a larger diameter than said head portion thereof, said stop flange being biased by the urging of said resetting spring toward a radially inwardly projecting holding lip which is provided at an end of said cavity in said twist member.

2. The atomizer according to claim 1, wherein said cavity in said twist member has first and second axially spaced portions, said first portion having a diameter greater than that of said second portion, and wherein said annular stop flange axially guides said valve pin through slidable engagement with an inner wall of said first portion of said cavity in said twist member.

3. The atomizer according to claim 1, wherein said valve seat is formed at an orifice of an axial bore which is provided through a lid portion of said socket and which is axially aligned with and communicates with said pressure duct.

4. The atomizer according to claim 3, wherein said lid portion is an integral part of said socket.

5. The atomizer according to claim 1, wherein said twist member has on its outer surface axially extending projections having therebetween individual fluid channels through which a liquid to be sprayed can flow axially from said pressure duct to said nozzle means when said check valve means is open.

6. The atomizer according to claim 5, wherein said projections have an axial length less than the axial length of said twist member and have a radial length selected so that a circle enveloping the radially outer ends thereof has a diameter which is larger than the diameter of an end portion of said socket at the open end of said axially extending cavity therein, wherein after said twist member has been axially inserted into said cavity in said socket said end portion snaps over an axial end of said projections.

7. The atomizer according to claim 1, wherein the axial length of said cavity in said twist member is selected so that said union nut can be rotated and thus moved axially until said nozzle means has moved said twist member to a position in which said twist member is engaging an end of said valve pin remote from said head portion thereof in a manner forcibly holding said head portion against movement away from said valve seat to thereby effect a blocking of fluid flow through said pressure duct.

8. The atomizer according to claim 1, wherein the axial length of said cavity in said twist member is sufficiently long so that, in all operational positions of said twist member effected by rotation of said union nut, said valve pin is capable of movement to a position in which said head portion thereof is spaced from said valve seat in order to permit fluid flow through said pressure duct.

9. A spray nozzle assembly of a manually operated liquid atomizer, comprising an elongate first member having a cavity which extends thereinto from a first end thereof in a first axial direction; an elongate second member removably inserted into said cavity in said first member and having therein a cavity which extends thereinto from a first end thereof in a second direction opposite said first direction; means for preventing movement of said second member in said second direction relative to said first member; a valve member supported in said cavity in said second member for reciprocal movement parallel to said first and second directions and having a head portion which can project axially outwardly past said first end of said second member; resilient means cooperable with said second member and said valve member for yieldably urging said valve member in said first axial direction relative to said second member; and stop means on said valve member and second member for limiting movement of said valve member in said first axial direction relative to said second member in response to the urging of said resilient means, including said valve member having an outwardly extending stop flange and said second member having an inwardly extending holding lip, said valve member being movable in said first direction until said stop flange engages said holding lip, engagement of said stop flange and said holding lip preventing further axial movement of said valve member in said first direction relative to said second member.

10. The spray nozzle assembly according to claim 9, wherein said stop flange and said holding lip are each annular, and wherein said cavity in said second member has an inwardly facing surface adjacent said holding lip which slidably engages said stop flange on said valve member, said slidable engagement of said inwardly facing surface and said stop flange guiding said valve member during said reciprocal movement thereof parallel to said first and second axial directions.

11. The spray nozzle assembly according to claim 10, wherein said valve member includes an elongate stem portion which extends away from said stop flange in said second axial direction, and wherein said resilient means includes a helical compression spring which is disposed in said cavity in said second member, which encircles said stem portion of said valve member, and which has one end supported on said stop flange and a further end supported on an inner end surface of said cavity in said second member.

12. The spray nozzle assembly according to claim 11, wherein said first member has an end wall at a second end thereof remote from said first end, said end wall of said first member having therethrough an axial bore which communicates with and has a cross-sectional size substantially less than that of said cavity in said first member, said end wall having thereon an annular valve seat which encircles said axial bore, said head portion of said valve member being yieldably urged into sealing engagement with said valve seat by said helical compression spring.

13. The spray nozzle assembly according to claim 12, wherein said means for preventing movement of said second member in said second axial direction relative to said first member includes said first member having in said cavity an inwardly extending annular flange immediately adjacent said first end of said first member and includes said second member having circumferentially spaced, axially extending ribs which each have an end facing in said second axial direction and being engageable with said annular flange on said first member.

14. The spray nozzle assembly according to claim 13, wherein said first member has in the region of first end thereof an outwardly extending annular sealing flange, and wherein said second member has a groove in an end surface thereof which faces in said second axial direction and is provided at a second end of said second member remote from said first end thereof.

15. The spray nozzle assembly according to claim 14, including a portion of an atomizer housing which is approximately cylindrical and extends approximately parallel to said first direction, which is externally threaded, which has at and end thereof an end surface facing approximately in said second axial direction, which has an opening extending thereinto in said first axial direction from said end surface thereof, and which has a pressure duct which opens into said opening therein at an inner end of said opening and which can carry a pressurized fluid to said opening; and including an internally threaded cup-shaped union member which is removably threadedly supported on said housing portion, which has therein a surface portion facing in said first axial direction and which has a nozzle opening extending therethrough in said second axial direction from said surface portion to a location external to said union member; wherein said first member is removably inserted in said opening in said housing portion, said axial bore therein being in fluid communication with said pressure duct in said housing portion and said sealing flange thereon being in sealing engagement with an inner surface of said union member, and said end surface of said second member therein being disposed firmly against said surface portion on said union member in a manner so that said groove therein and said nozzle opening in said union member are in fluid communication.

* * * * *

UNITED STATES PATENT AND TRADEMARK OFFICE

CERTIFICATE OF CORRECTION

PATENT NO. : 4 678 123

DATED : July 7, 1987

INVENTOR(S) : Karlheinz KLAEGER

It is certified that error appears in the above-identified patent and that said Letters Patent is hereby corrected as shown below:

Column 7, line 5; change "and" to ---an---.

Signed and Sealed this

Eighth Day of December, 1987

*Attest:*

DONALD J. QUIGG

*Attesting Officer*

*Commissioner of Patents and Trademarks*